UNITED STATES PATENT OFFICE.

EDGAR N. McVEIGH, OF COLUMBUS, OHIO, ASSIGNOR TO THE KEEVER STARCH COMPANY, OF COLUMBUS, OHIO, A CORPORATION OF OHIO.

METHOD FOR PRODUCING LAUNDRY STARCH.

1,406,050. Specification of Letters Patent. Patented Feb. 7, 1922.

No Drawing. Application filed May 19, 1920. Serial No. 382,636.

*To all whom it may concern:*

Be it known that I, EDGAR N. McVEIGH, a citizen of the United States, residing at Columbus, in the county of Franklin and State of Ohio, have invented certain new and useful Improvements in Methods for Producing Laundry Starch, of which the following is a specification.

This invention relates to an improved method for producing laundry starch, and has for its primary object to produce a starch wherein the different ingredients entering the same will be uniformly proportioned throughout the entire body of the starch, so that the desired proportions may be obtained by the use of any part of the starch formed in accordance with the principles of this invention.

By way of introduction it may be stated that laundry starch usually consists of one-half wheat starch and one-half corn starch, equal quantities of the two starches being usually mixed together in either granular or powder form by any suitable mixing process. This method of intermingling the starches while the same are in crystallized or powder form has never proven entirely satisfactory for the reason that although equal amounts of the two starches are mixed together, owing to the difference in the formation of the particles of the starch, and the fact that the wheat starch particle is harder than the corn, it has been found that in shipping and handling the product the corn becomes a very fine powder, and the wheat does not break up so readily so that by the time the product reaches the consumer for use, the larger grains of the starch have worked to the ends and around the outsides of the barrel or other container in which the starch is handled, leaving the powder in the center and thereby causing the separation of the two starches. Therefore, when this starch is used in a laundry there is no assurance that the given quantity of the same, taken at random from a barrel, contains one-half wheat and the other half corn starch, although this was the original and intended mixture. Further, it may be stated that in the laundry business it is very necessary that the starch should be absolutely uniformly proportioned in order that the best results may be obtained. For instance, if an over-abundance of corn starch is employed, the garments will possess an extremely stiff and unpliable character, and on the contrary if the wheat starch is employed to excess, the garments will be altogether too pliable and flexible therefore, it is essential that the corn and wheat starches be uniformly mixed in proportions in order that the finished garments will be given the requisite appearance and character. In view of this condition the laundry trade frequently purchases the corn and wheat starch in separate barrels and then intermingles the same when desired for use, but the objection to this system is that double quantities of the starch must be carried, and furthermore through the carelessness or indifference of the employes the proper proportions are not to be obtained.

The present invention consists, therefore, in combining wheat and corn starch while the latter are in a state constituting a colloidal suspension in water, and by this process the finally completed product will be uniformly proportioned throughout a given mass of the same to effect this end, the corn starch is prepared by soaking grain corn in tanks containing a weak sulphurous acid solution, in order that the hulls may be loosened from the body of the grain. These grains after being so treated are then subjected to the action of a separator, in order that the loosened hulls may be completely removed from the body of the grain. After the removal of the hulls and germs the grain is ground and is mixed with a suitable quantity of water, whereupon the resultant liquid mixture is flowed over a series of tables, in order that the excess water may flow off the starch and to permit the latter to settle so that the same may be collected. This process of producing corn starch is well known, and hence no claim is made to the same per se. It will be evident, however, that upon the completion of this process the collected corn starch will constitute a colloidal suspension in water, known to the trade as starch milk, which has the consistency substantially of ordinary dairy cream, and is a finished product with the exception of drying. The wheat starch is formed in the usual manner, that is, wheat flour is mixed in any suitable manner, such for example as a dough mixer, and is subjected to the usual washing process for the purpose of separating or removing the gluten from the starch. When this gluten has been removed the resultant starch is passed over the settling tables, well known in the art, which allow the excess water to pass over and to permit the remaining wheat starch to settle to the bottoms of the tables, in order that the starch may thus be collected and dried.

Hitherto it has been the common process to dry these different starches in a separate state in order that they could be reduced to a granular or powdered form, and then mechanically mixed, as above stated, for trade purposes. However, the present invention, in order to overcome the above stated disadvantages, takes these two starch creams in equal amounts so that the same may be put together in large tanks and equipped with agitators in which they are thoroughly mixed and beaten together. The construction of these tanks from a mere mechanical standpoint, is deemed unimportant, as it is obvious that the mixers may be of many desirable constructions. After being thoroughly mixed in their semi-liquid condition, the starches form a composite product, which latter is withdrawn from the tanks and is put through the regular drying process, hitherto utilized in drying the starches in a separated manner. When the starch has been finally dried it assumes a granular form, each grain and particle containing one-half wheat and one-half corn combined into a mechanically inseparable whole, which thereby assures the user a uniformity which can not be obtained by the previously discussed prior methods.

From the foregoing description it will be seen that by the process described the blending of the two liquid starches together before drying is capable of producing a more uniform product than it is possible for the laundryman to make in his own plant. The process has the added advantage of enabling the user to cover his starch requirements with one barrel of starch instead of two, and also results in a saving of the labor of mixing and the possibility of errors in preparation, which is a very important item in this particular business. It will therefore be seen that the present invention consists in the process of blending two processes together in their liquid form before being dried and sold as a finished product.

What is claimed is:

1. The process of producing laundry starch, which consists in blending wheat and corn starches by mixing the same together while they are in a form comprising a colloidal suspension in water.

2. The process of producing laundry starch, which consists in blending wheat and corn starches together while they are in a form comprising a colloidal suspension in water, and in subsequently drying the same to produce the finished product.

3. The process of producing laundry starch, which consists in blending equal proportions of wheat and corn starches together while they are in a form constituting a colloidal suspension in water, and in subsequently drying the combined starches.

In testimony whereof I affix my signature.

EDGAR N. McVEIGH.